(12) United States Patent
Dooley et al.

(10) Patent No.: US 6,778,134 B2
(45) Date of Patent: Aug. 17, 2004

(54) METHOD AND APPARATUS FOR ESTIMATING GPS TIME

(75) Inventors: Saul R. Dooley, Reigate (GB); Andrew T. Yule, Felbridge (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/197,341

(22) Filed: Jul. 17, 2002

(65) Prior Publication Data

US 2003/0016167 A1 Jan. 23, 2003

(30) Foreign Application Priority Data

Jul. 21, 2001 (GB) .............................................. 0117883

(51) Int. Cl.[7] .............................. G01S 5/02; H04B 7/185
(52) U.S. Cl. .............................. 342/357.1; 342/357.06; 701/213
(58) Field of Search ........................ 342/357.1, 357.06; 701/213; 455/456.1

(56) References Cited

U.S. PATENT DOCUMENTS

| 5,841,396 A | 11/1998 | Krasner ...................... 342/357 |
| 5,874,914 A | 2/1999 | Krasner ...................... 342/357 |
| 5,945,944 A | 8/1999 | Krasner .................. 342/357.06 |
| 6,208,871 B1 | 3/2001 | Hall et al. ................... 455/517 |
| 6,327,473 B1 * | 12/2001 | Soliman et al. ............. 455/456 |

FOREIGN PATENT DOCUMENTS

| WO | WO9953338 | 10/1999 | ............. G01S/5/14 |
| WO | WO0120818 | 3/2001 | ............ H04B/7/26 |

* cited by examiner

*Primary Examiner*—Theodore M. Blum
(74) *Attorney, Agent, or Firm*—Gregory L. Thorne

(57) ABSTRACT

A method of providing an estimate of GPS time from non-GPS timing information present in communications signals transmitted from a base station (BS1) to a first mobile communications device (MS1) is provided comprising the steps of (i) in a second mobile communications device (MS2), receiving corresponding non-GPS timing signals present in communications signals transmitted by the base station; (ii) in a GPS receiver (23, 24) of the second mobile communications device (MS2), obtaining at least one pseudorange to a GPS satellite (GPS SV) and obtaining an first estimate of GPS time; (iii) deriving a relationship between the receipt of timing signals received in step (i) and the estimate of GPS time obtained in step (ii); and (iv) from the non-GPS timing information received by the first mobile communications device (MS1) and the relationship derived in step (iii), calculating a second estimate of GPS time.

29 Claims, 2 Drawing Sheets

METHOD AND APPARATUS FOR ESTIMATING GPS TIME

FIELD OF INVENTION

This invention relates to a method of providing an estimate of GPS time from non-GPS timing information present in communications signals transmitted from a base station to a mobile communications device, and to apparatus for the same.

BACKGROUND TO INVENTION

It is well known to provide a GPS receiver in which replica GPS satellite pseudorandom noise (PRN) code signals are continuous generated and correlated with received GPS signals in order to acquire them. Typically, as the replica codes are likely to have a different code phase to those of the received GPS signals and also a different frequency due to Doppler shift between the receiver and orbiting satellites, a two dimensional code frequency/phase sweep is employed whereby such a sweep will eventually result in the incoming PRN code having the same frequency and code phase as that of the locally generated replica. If detected, the code is acquired and tracked, and the pseudo-range information may be retrieved from which the position of the receiver may be calculated using conventional navigation algorithms.

It is further known to provide a mobile cellular telephone incorporating such a GPS receiver for the purpose of enabling operators of cellular telephone networks to determine the location from which a call is made and, in particular, for an emergency call to the emergency services. Of course for an emergency call, it is desirable for the call location to be available as soon as possible, however, from a "cold start" where the GPS receiver does not have access to up to date ephemeris data or even worse from a "factory cold start" where the GPS receiver does not have an up to date almanac, the time to first fix (TTFF) can be anywhere between 30 seconds and 15 minutes.

In order to reduce the TTFF, a GPS receiver may be provided with base station assistance in order to acquire GPS signals more quickly. Such assistance may include the provision by the base station to the receiver of a precision carrier frequency reference signal for calibrating the local oscillator used in the GPS receiver; the data message for up to date satellite almanac and ephemeris data from which Doppler shift for satellites in view can be determined. With such assistance, it is possible to sweep only a narrowed range of frequencies and code phases in which the target PRN code is known to occupy, thereby reducing the number of code instances that need to be checked and thus reducing the time for code acquisition. Base station assistance is further described in U.S. Pat. Nos. 5,841,396 and 5,874,914 which are incorporated herein by reference.

In order to acquire GPS signals even more quickly, it is desirable for the GPS receiver to be in possession of an accurate estimate of GPS time before despreading any of the GPS signals. With an accurate estimate of GPS time, a rough estimate of the position of the GPS receiver location and knowledge of the GPS satellites orbits, it is possible to predict further aspects of the incoming GPS signals such as data bit polarities, the timing of data bit edges and code phases, so making the GPS signals easier to acquire.

U.S. Pat. No. 5,945,944 discloses an arrangement in which a mobile cellular telephone comprises a GPS receiver and derives GPS timing information from network timing information contained in transmissions received by the telephone from corresponding network base stations. This is especially convenient for networks such as those compliant to the IS-95 and CDMA2000 standards as their base stations include GPS receivers to ensure their synchronization. However, as acknowledged in U.S. Pat. No. 5,945,944, not all networks have such synchronized between base stations.

Lines 38 to 53 of column 16 of U.S. Pat. No. 5,945,944 purport to disclose a method of obtaining GPS time in an unsynchronized network. Specifically, it states that the problem of requiring that each GPS basestation has access to the timing information of the cell site is partially solved by having a series of cellular telephones located in each cell so that the absolute time for that cell may be coordinated between a GPS basestation and a remote unit, independently of the location of the remote unit within the cell. From this somewhat limited disclosure, it is not obvious how obtaining GPS time in such an unsynchronized network is in fact achieved.

OBJECT OF INVENTION

It is therefore an object of the present invention to provided a method of providing an estimate of GPS time from non-GPS timing information present in communications signals transmitted from a base station to a mobile communications device, especially where the base station is one of several such basestations in a cellular telephone network which are not synchronized using GPS receivers.

SUMMARY OF INVENTION

In accordance with the present invention, such as a method is provided comprising the steps of: (i) in a second mobile communications device, receiving corresponding non-GPS timing signals present in communications signals transmitted by the base station (ii) in a GPS receiver of the second mobile communications device, obtaining at least one pseudorange to a GPS satellite and obtaining an estimate of GPS time; (iii) deriving a relationship between the receipt of timing signals received in step (i) and the estimate of GPS time obtained in step (ii); and (iv) from the non-GPS timing information received by the first mobile communications device and the relationship derived in step (iii), calculating an estimate of GPS time.

The above method enables an estimate of GPS time to be provided in the first mobile communications which maybe be used, for example, to rapidly acquire GPS signals in a GPS receiver of the first mobile communications device, or to provide a GPS time based time-stamp. In the case of the latter, the first mobile communications does not strictly require a GPS receiver.

In a preferred method, both the first and second mobile communications devices are synchronized with the base station in a manner which takes in to account variation in the transmission times of transmissions sent between the mobile communication devices and the base station. This would enable the estimate of GPS time to be provided independently of the location of both the first and second mobile communications devices.

Also, whilst a single pseudorange to a GPS satellite in combination with an estimate of the locations of the corresponding GPS satellite and the second mobile communications device can be used to obtain an estimate of GPS time, it is preferable that the GPS receiver of the second mobile communications device obtains at least four pseudoranges to respective GPS satellites as such location information would not then be required.

One would normally expected the calculation of step (iv) to be done in the first mobile communications device so as to enable the incoming GPS signals to be despread at the same time. However, it will be appreciated that a sample of the GPS signal (occasionally referred to as a snapshot) could be uploaded via the base station to a remote computer and, say if the snapshot time is time stamped with the non-GPS timing information, the calculation of (iv) and subsequent despreading of the GPS signal done at the remote computer.

The relationship between the receipt of non-GPS timing signals and the estimate of GPS time derived in step (iii) may be uploaded to a database held on a server located remote from the mobile communications devices, e.g. one held on a web-server and capable of being accessed by the first mobile communications device over the internet or, alternatively, one connected to a network system controller.

Ideally, the database is capable of being accessed not only by the first mobile communications device but by other mobile communications devices registered with the same base station. Also, where the base station is one of several such basestations of a cellular telephone network which are not synchronized using GPS receivers, the database preferably contains relationships of the type derived in step (iii) for at least two such basestations.

Further provided in accordance with the present invention is a corresponding system comprising a base station and first and second mobile communications devices as claimed in claims 14 to 25; and mobile communications devices as claimed in claims 26 to 29.

DESCRIPTION OF DRAWINGS

Methods and corresponding apparatus according to the present invention will now be described, by way of example only, with reference to the accompanying drawings in which.

DETAILED DESCRIPTION

Figure 1:
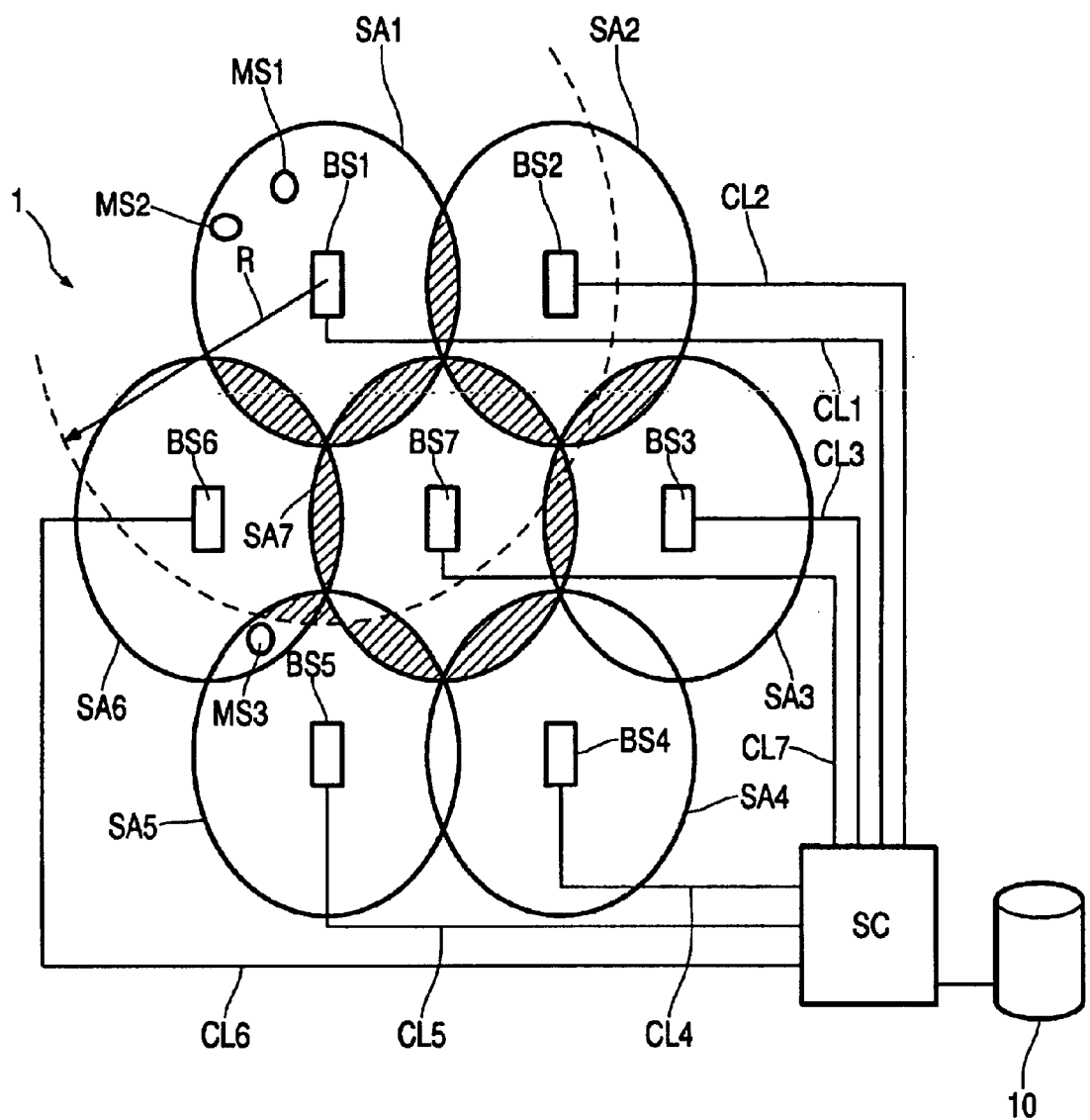
FIG. 1 shows the geographic layout of a GSM cellular telephone network.

The geographical layout of a conventional GSM cellular telephone network 1 is shown schematically in FIG. 1. The network comprises a plurality of base stations BS of which seven, BS1 to BS7, are shown, situated at respective, mutually spaced geographic locations. Each of these base stations comprises the entirety of a radio transmitter and receiver operated by a trunking system controller at any one site or service area. The respective service areas SA1 to SA7 of these base stations overlap, as shown by the cross hatching, to collectively cover the whole region shown. The system may furthermore comprise a system controller SC provided with a two-way communication link, CL1 to CL7 respectively, to each base station BS1 to BS7. Each of these communication links may be, for example, a dedicated land-line. The system controller SC may, furthermore, be connected to a public switched telephone network (PSTN) to enable communication to take place between a mobile cellular telephone MS1 and a subscriber to that network. The system controller SC is connected to a database 10, the function of which will be described later. A plurality of mobile cellular telephones MS are provided of which three, MS1, MS2 and MS3 are shown, each being able to roam freely throughout the whole region, and indeed outside it. Mobile cellular telephones MS1 and MS2 are both located in the region serviced by base station BS1.

Figure 2:
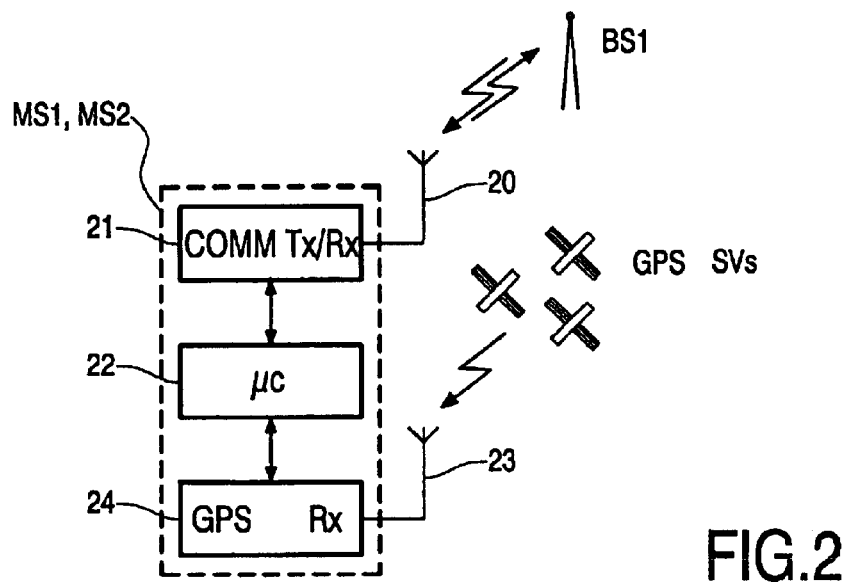
FIG. 2 shows the configuration of mobile cellular telephones MS1 and MS2 of FIG. 1 in greater detail.

FIG. 2 shows in greater detail the configuration of mobile cellular telephones MS1, MS2, each comprising a communications transmitter (Comm Tx) and receiver (Comm Rx) 21 connected to a communications antenna 20 and controlled by a microprocessor ($\mu$c) 22 for communication with the base station BS1 with which they are registered. The design and manufacturing of such telephones for two-way communication within a cellular telephone network are well known, those parts which do not form part of the present invention will not be elaborated upon here further.

In addition to the conventional components of a mobile telephone, telephones MS1, MS2 further comprise a GPS receiver (GPS Rx) 24 connected to a GPS antenna 23 and controlled by the microprocessor ($\mu$c) 22 for receiving GPS spread spectrum signals transmitted from orbiting GPS satellites. When operative, the GPS receiver 24 may receive NAVSTAR SPS GPS signal through an antenna 23 and pre-process them, typically by passive bandpass filtering in order to minimize out-of-band RF interference, preamplification, down conversion to an intermediate frequency (IF) and analog to digital conversion. The resultant, digitised IF signal remains modulated, still containing all the information from the available satellites, and is fed into a memory (not shown) of the microprocessor 22. The GPS signals may then be are acquired and tracked in any of several digital receiver channels, typically up to 12, for the purpose of obtaining pseudorange information from which the position of the mobile telephone can be determined using conventional navigation algorithms. Such methods for GPS signal acquisition and tracking are well known, for example, see chapter 4 (GPS satellite signal characteristics) & chapter 5 (GPS satellite signal acquisition and tracking) of GPS Principles and Applications (Editor, Kaplan) ISBN 0-89006-793-7 Artech House. The general purpose microprocessor 22 shown controls both base station communication and GPS processing, however, it will be appreciated that these may of course be accomplished in, for example, using two or more integrated circuits (ICs).

As is known, in the event of the user of mobile cellular telephone MS1 making an emergency call and under the control of the system controller SC via a two-way communication link CL1, a position fix may be transmitted from mobile cellular telephone MS1 back to the base station and then on to the emergency services operator, termed the Public Safety Answer Point (PSAP) in the US. In order to obtain the position fix and in accordance with the present invention, the GPS processor 25 of mobile telephone MS1 acquires incoming GPS signals as described in steps (1) to (3) described below:

Step (1). Located nearby cellular telephone MS1 and registered with the same GSM base station is mobile cellular telephone MS2. Some time before the emergency call was made using telephone MS1, telephone MS2 had obtained 4 pseudoranges for the purposes of obtaining a position fix and in doing so was able to determine GPS time. As telephone MS2 was in receipt of "local" GSM time (that is GSM timing information pertaining to serving basestation BS1 in the form of hyper, super, multi and single frame numbers together and also timeslot information), it was able to derive a relationship between local GSM time and GPS time. This relationship was then uploaded via base station BS1 to the system controller where it is stored in a database 10.

Step (2). Under the control of the system controller SC via a two-way communication link CL1, the base station BS1 provides up to date almanac and ephemeris data. This data may be provided by a GPS receiver connected to the system controller (i.e. not necessarily near or at the base station BS1) or, alternatively, by a GPS receiver in a mobile cellular telephone deployed anywhere in the telephone network.

Step (3). In addition to the up to date almanac and ephemeris data, base station BS1 transmits to mobile cellular telephone the relationship between GSM and GPS time. As mobile cellular telephone MS1 is registered with the same base station BS1, it is therefore in possession of the same local GSM time and is able to estimate GPS time. Mobile cellular telephone MS1 uses this estimate of GPS to (i) in combination with the received ephemeris data, estimate the frequency and code phase of incoming GPS signals prior to acquisition, thereby reducing the scope of the code phase search and speeding up acquisition; and (ii) predict the timing of the data bit edges to ensure that only coherent correlation is used in the signal acquisition process, thereby enabling weaker GPS signals to be acquired.

GSM basestation clocks are typically Rubidium clocks with an accuracy of better than 0.1 ppm. However, whilst both GPS and GSM time is very stable, some inaccuracy in the estimate of GPS time may be present due to drift between GPS and GSM time from when the relationship between GPS and GSM time was established in mobile telephone MS2. It is therefore desirable that the relationship derived by mobile cellular telephone MS2 and stored in the database 10 is updated frequently. It is further desirable that the relationship is independently derived by several or many other mobile cellular telephones registered with base station BS1 to avoid spurious timing measurements.

Figure 3:
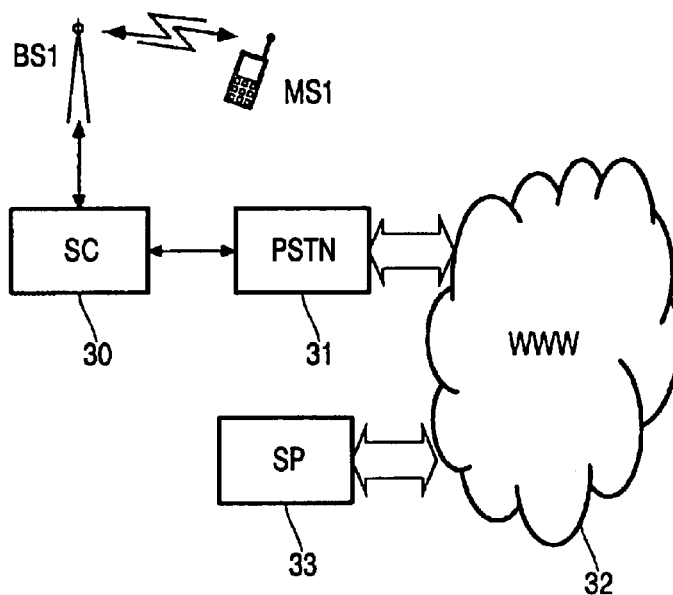
FIG. 3 shows the connection between cellular telephones MS1 and MS2 and a remote, internet based, service provider.
Figure 4:
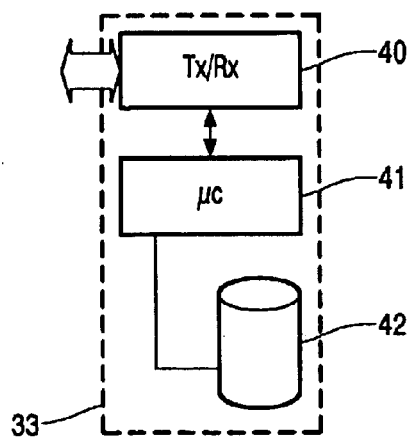
FIG. 4 shows the apparatus employed by the remote internet based service provider of FIG. 3.

In an alternative arrangement as shown in FIGS. 3 and 4, suppose the user of mobile cellular telephone MS1 wishes to request an internet based service such as checking a bank balance from an on-line banking web-site or to make an on-line purchase, and further suppose that a GPS time stamp is required to validate the user's request. Mobile cellular telephone MS1 first accesses the internet (www) 32 in a conventional manner, as illustrated in FIG. 3, by transmitting and receiving via the base station BS1, a cellular network system controller (SC) 30 and the a public switched telephone network 31. The internet based service provider (SP) employs communication apparatus 33 connected to the web to communicate with telephone MS1 which, as shown in greater detail in FIG. 4, comprises amongst other things a transmitter and receiver 40 for communicating with mobile telephone MS1, a microprocessor 41 and a data base 42 for storing any necessary information.

Further suppose that mobile cellular telephone MS1 is either in an urban canyon and unable to acquire sufficient GPS signals to derive GPS or its GPS receiver is inoperative (or indeed it doesn't have a GPS receiver). An estimate of the relationship between local GSM time and GPS time can be provided to mobile telephone MS1 in the same manner as steps (1) to (3) above from which an estimate of GPS time can be derived. This estimate can be provided to the internet based service provider without having to acquire GPS signals, i.e. without having to despread GPS signals. Alternatively, the estimate of GPS time can be used to despread the GPS signals in order to derive a precise estimate of GPS time.

Also, whilst the relationship between local GSM time and GPS time derived in mobile telephone MS2 is passed to telephone MS1 via a database connected to the system controller, it will be appreciated that this relationship could be passed by direct communication, e.g. a Bluetooth or other short range communications link between telephones MS1 and MS2, or passed via an internet based server provider including possibly the same provider as would render other services to the user of telephone MS1.

The relationship between GSM and GPS time may be based on all GSM timing information as in the above example including hyper, super, multi and single frame numbers and timeslot information. However, depending on the accuracy of the estimate required, not all this information need be provided. For example, just the frame numbers would provide an estimate to 4.615 ms intervals which still be sufficient to estimate observed Doppler on incoming GPS signals and to limit the search for of code phase synchronization, so ensuring a rapid TTFF. For the purpose of providing a timestamp, a relationship between GSM and GPS time based solely on the GSM hyper and super frame numbers might well suffice.

The invention has largely been described in the context of NAVSTAR GPS, the all weather, spaced based navigation system developed and currently operated by the US Department of Defense. However, it will be appreciated that the general underlying principles of GPS are universal and not merely limited to NAVSTAR. Accordingly, GPS is intended to refer to any positioning system comprising a plurality of radio transmitters at different locations and a receiver which determines its location based on the time of arrival of the transmissions of the radio transmitters including as GLONASS, Galileo.

Also, from a reading of the present disclosure, other modifications will be apparent to the skilled person and may involve other features which are already known in the design, manufacture and use of both GPS receivers and mobile communications devices, and component parts thereof, and which may be used instead of or in addition to features already described herein.

What is claimed is:

1. A method of providing an estimate of GPS time from non-GPS timing information present in communications signals transmitted from a base station to a first mobile communications device, the method comprising the steps of:
    (i) in a second mobile communications device, receiving corresponding non-GPS timing signals present in communications signals transmitted by the base station
    (ii) in a GPS receiver of the second mobile communications device, obtaining at least one pseudorange to a GPS satellite and obtaining an first estimate of GPS time;
    (iii) deriving a relationship between the receipt of timing signals received in step (i) and the estimate of GPS time obtained in step (ii); and
    (iv) from the non-GPS timing information received by the first mobile communications device and the relationship derived in step (iii), calculating a second estimate of GPS time.

2. A method according to claim 1 wherein both the first and second mobile communications devices are synchronized with the base station in a manner which takes in to account variation in the transmission times of transmissions sent between the mobile communication devices and the base station.

3. A method according to claim 1 wherein the base station is one of several such basestations of a cellular telephone network which are not synchronized using GPS receivers.

4. A method according to claim 1 wherein the GPS receiver of the second mobile communications device obtains at least four pseudoranges to respective GPS satellite in order to obtaining an estimate of GPS time.

5. A method according to claim 1 wherein the calculation of step (iv) is done in the first mobile communications device.

6. A method according to claim 1 wherein the first mobile communications device comprising a GPS receiver, and wherein the estimate of GPS time is used in that to rapidly acquired GPS signals.

7. A method according to claim 1 wherein the estimate of GPS time is used to provide a GPS time based time-stamp.

8. A method according to claim 7 wherein the first mobile communications device does not comprise a GPS receiver.

9. A method according to claim 1 wherein the relationship derived in step (iii) is uploaded to a database stored on a server which is located remote from the mobile communications devices.

10. A method according to claim 9 wherein the database is capable of being accessed to retrieve the relationship derived in step (iii) for calculating a second estimate of GPS time from that relationship and from non-GPS timing information received by the first and other mobile communications device in communication with the same base station.

11. A method according to claim 9 wherein the base station is one of several such basestations of a cellular telephone network which are not synchronized using GPS receivers;

and wherein the database contains relationships of the type derived in step (iii) far at least two such basestations.

12. A method according to claim 9 wherein the server is web based and capable of being accessed over the internet.

13. A method according to claim 9 wherein the database is connected to a network system controller.

14. A system comprising a base station and first and second mobile communications devices wherein the system is configured to derive a relationship between non-GPS timing signals present in communications signals transmitted by the base station to the second mobile communications device and a first estimate of GPS time obtained from a GPS receiver of the second mobile communications device, and using said relationship and non-GPS timing information received by the first mobile communications device, to obtain a second estimate of GPS time.

15. A system according to claim 14 wherein both the first and second mobile communications devices are synchronized with the base station in a manner which takes in to account variation in the transmission times of transmissions sent between the mobile communication devices and the base station.

16. A system according to claim 14 wherein the base station is one of several such unsynchronized basestations in a cellular telephone network.

17. A system according to claim 14 wherein the second estimate of GPS time is obtained in the first mobile communications device.

18. A system according to claim 14 wherein the first mobile communications device comprising a GPS receiver, and wherein the second estimate of GPS time is used to rapidly acquired GPS signals.

19. A system according to claim 14 wherein the second estimate of GPS time is used to provide a GPS time based time-stamp.

20. A system according to claim 19 wherein the first mobile communications device does not comprise a GPS receiver.

21. A system according to claim 14 further comprising a server located remote from the mobile communications devices and on which is stored a database to which the relationship derived in step (iii) is uploaded.

22. A system according to claim 21 wherein the database is capable of being accessed to retrieve the relationship derived in step (iii) for calculating a second estimate of GPS time from that relationship and from non-GPS timing information received by the first and other mobile communications device in communication with the same base station.

23. A system according to claim 21 wherein the base station is one of several such basestations of a cellular telephone network which are not synchronized using (IFS receivers; and wherein the database contains relationships of the type derived in step (iii) for at least two such basestations.

24. A system according to claim 21 wherein the server is web based and capable of being accessed over the internet.

25. A system according to claim 21 wherein the database is connected to a network system controller.

26. A mobile communications device comprising a GPS receiver and adapted to transmit to a corresponding communications base station information describing the relationship between the receipt of non-GPS timing signals present in communications signals transmitted by the base station and received by the device and an estimate of GPS time obtained using the GPS receiver.

27. A mobile communications device comprising a communications receiver adapted to receive from a corresponding communications base station information describing the relationship between the GPS timing signals present in communications signals transmitted by the base station and GPS time, and a processor for using the relationship to obtain an estimate of GPS time at the mobile communications device; wherein the mobile communications device is able to communicate the base station being one of several such basestations of a cellular telephone network where are not synchronized using GPS receivers.

28. A mobile communications device according to claim 27 wherein the mobile communications device is able to communicate the base station being one of several such basestations of a cellular telephone network which are not synchronized at all.

29. A mobile communications device comprising a communications receiver adapted to receive from a corresponding communications base station information describing the relationship between non-GPS timing signals present in communications signals transmitted by the base station and GPS time, and a processor for using the relationship to obtain an estimate of GPS time at the mobile communications device; wherein the mobile communications device does not comprise a GPS receiver.

* * * * *